July 13, 1937.  E. P. BULLARD, 3D  2,086,851
MACHINE CONTROLLER
Filed Aug. 29, 1936
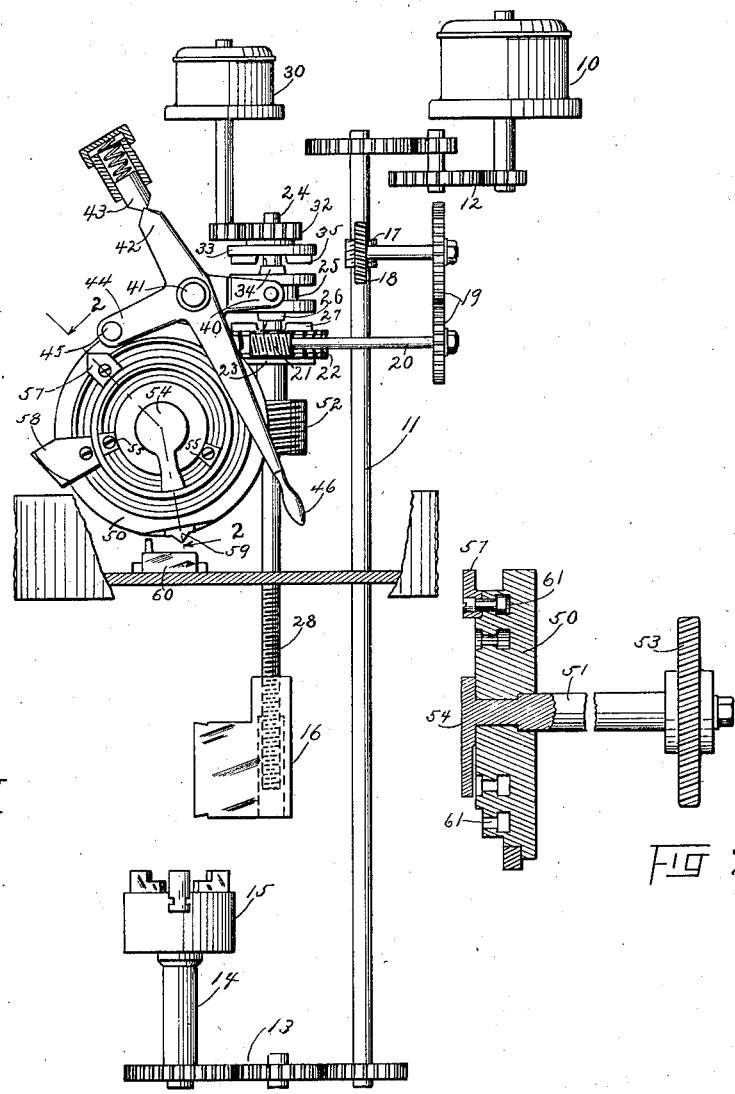
INVENTOR.
EDWARD P. BULLARD, III.
BY H. T. Sperry
ATTORNEY.

Patented July 13, 1937

2,086,851

UNITED STATES PATENT OFFICE 2,086,851

MACHINE CONTROLLER

Edward P. Bullard, III, Fairfield, Conn., assignor to The Bullard Company, a corporation of Connecticut Application August 29, 1936, Serial No. 98,472

16 Claims. (Cl. 29—64)

This invention relates to machine tools and is particularly concerned with controller mechanisms therefor whereby various elements and operations thereof may be regulated to provide for a uniform cycle of operation.

In particular, the invention relates to machine tool controllers and is, in general, applicable to rotors, cams, disks, or other reciprocating or oscillating controller devices, which may be used for providing the proper timing sequence for various cooperating instrumentalities.

The invention is particularly adaptable as an element in a machine tool feed works in which it may control the moving of a drive-selecting clutch. The invention is susceptible of practical and successful application to machine tool feed works of the character set forth in the copending application of Edward C. Bullard, Serial No. 729,366, filing date June 7, 1934.

It is among the general objects of the invention to provide a machine tool controller mechanism of simple and efficient construction and one designed to faithfully perform the necessary operations for the control of the associated mechanism.

A more specific object of the invention is to provide a machine tool controller mechanism arranged to minimize the required movement of parts. In this manner, the structure may be more compact and of a less number of parts than is usually otherwise the case.

Another object of the invention is to provide a lost motion arrangement incorporated in a machine tool controller mechanism thus to minimize the amount of adjustment required when a change in cycle of the mechanism is desired.

A further and still more specific object is to provide a controller disk for a machine tool feed works, which is driven through variable lost motion connection so as to preclude the necessity of changing the position of clutch operating cams with every change in length of the traverse phase of the cycle.

One of the important objects of the invention is to provide a controller for controlling multi-phase operating cycles, as in a machine tool, in which the length of the phases may be independently varied and are not required to constantly maintain the sum total determined by the physical characteristics of the controlling disk, or the amount of its movement.

A further important object is to provide a controlling disk assembly in which the phases of an operating cycle may be reduced to a minimum. This object is carried out in the accomplishment of another object, namely, that of providing a device in which the rotation of the cam driving shaft can be greater than 360 degrees. With the cam directly and continuously driven from the cam driving shaft, the amount of rotation in the shaft is necessarily limited to something under 360 degrees. With the structure here shown, the amount of rotation in the shaft may be greater than 360 degrees, since part of the rotation may be taken up by the lost motion and, therefore, the speed of the cam, with respect to the shaft driven, may be increased. Since the minimum of any one phase of the cycle is directly proportional to the possible speed of the cam, it is obvious that the minimum may be reduced when the speed of the cam is increased.

Numerous objects and advantages of the invention will be apparent from consideration of the drawing in which:

Figure 1 is a schematic illustration of a machine tool embodying one form of the present invention; and Figure 2 is a detailed sectional view taken on the line 2—2 of Figure 1.

The invention is shown, and is particularly adapted, for the control of the feed works of a lathe type of machine tool although, of course, it may well be applied to other elements of this or other types of machine tools. For purposes of simplicity, the illustration confines itself to the showing of a single work spindle machine in which the feed works drives a rotatable feed rod which, by threaded connection, reciprocates a tool head towards and away from a work spindle. Obviously the invention is not confined to either vertical or single spindle tools, but is particularly designed for multiple machine tools of the general type shown in the prior patent to E. P. Bullard, Jr., No. 1,360,175, issued November 23, 1920, and the control structure hereof may be applied to other types of tool head feeding means than that illustrated.

In general terms, the invention consists of a controller cam, or disk, adapted to actuate a machine tool feed works mechanism by certain cams, and the like, thereon, and a drive for the disk, operable in synchronism with the feed works, and including a variable lost motion connection so arranged as to permit the disk to stand still for predetermined portions of the operating cycle of the mechanism.

The accomplishments of the various objects of the invention may be more easily understood from a consideration of the application of the invention to the machine tool feed works illustrated, the operating cycle of which includes a down rapid traverse movement followed by a feeding movement in the same direction and a return rapid traverse movement to the original starting place.

The present structure distinguishes itself from devices in which the controlling cam carrying disk is directly and positively driven, by the fact that the adjustable lost motion permits one of the phases of operation, preferably the traverse phase, to take place without movement of the disk. Thus, this phase may be increased or decreased without adjustment of the clutch throwing dogs of the disk, and it will permit the whole possible movement of the disk to be used for feed, while the lost motion may be used for traverse, thus increasing the total throw possible by a disk of commensurate size. This feature also permits the disk driving shaft to be driven at a higher rate of speed so that in one cycle of operation, it may be turned more than 360 degrees and, since in any given size disk a definite angle of rotation is required to move an arm, a predetermined distance, it will be seen that, if the speed of cam movement can be increased, the cam will move through the required angle at a greater rate of speed and thus the minimum duration of any phase may be reduced.

Referring more particularly to the drawing, Figure 1 is a schematic showing of a machine tool embodying the invention. The numeral 10 indicates a main motor which drives one or more spindle drive shafts 11 through gearing 12, in connection with which reference may be had to the copending application, Serial No. 729,366, filed June 7, 1934, for Bi-motor feed works. Rotation of the spindle is provided from the shaft 11 through suitable mechanism indicated by gears 13. A spindle 14 is provided with a usual chuck or fixture 15 which secures the work for rotation with the spindle and to be operated upon for turning or drilling, or the like, by tools (not shown) carried in a tool head 16.

For moving the tool head towards the work in timed relation to the rotation of the spindle, a driving connection from the shaft 11 is provided through a worm and worm wheel 17 and 18 and change gears 19 to a shaft 20 which, in turn, carries a worm 21 meshing with worm wheel teeth 22 of a loose feed gear clutch 23. Feeding speed rotation for a screw feed rod 24 is applied from the gear clutch 23 through a slidable clutch element 25 keyed to the rod 24. When the clutch is in downward position, its lower teeth 26 engage the surface of teeth 27 of the feed clutch gear 23, thus to impart rotation to the shaft 24 in synchronism with the speed of the spindle rotation. It will be understood, of course, that the rod 24 is threaded, as at 28, to co-act with similar threads of the tool head whereby rotation of the rod 24 will affect a reciprocation of the head with respect to the spindle.

For rotating the rod 24 at a high speed in both directions, so as to traverse the tool head rapidly towards and away from the spindle as prior to and after the cutting action, there is provided a separate reversible traverse motor 30, the motor shaft of which is geared to teeth 32 of a traverse gear 33. The gear 33 is loosely mounted upon the shaft 24 and is adapted to selectively drive the same through engagement of the clutch 25, upper teeth 34 of which are adapted to engage teeth 35 of the gear 33.

The clutch 25 is moved axially on the rod 24, to which it is splined, through the medium of a clutch arm 40, which engages the clutch and which is pivoted, as at 41, to a suitable part of the feed works bracket. The clutch arm 40 forms one of four arms of a pivoted lever arrangement, which also includes an upwardly extending arm 42, having a pointed exteremity engageable with a spring urged arrowhead 43, the operation of which insures full throwing of the arm by the disk and which, also, permits a retention of the clutch in the neutral position as shown. The lever further includes a downwardly directed arm 44 having an extremity 45 for engaging the cams or dogs of the disk. The arrangement of the parts shown in the drawing in Figure 1 shows the clutch in neutral position, the point 42 being so retained by engagement in the central notch of the arrowhead 43 from which position it may be moved by the operation of a handle 46, which forms the fourth arm of the lever.

The controller, itself, consists of a two part structure, including, as shown in Figure 2, an annular cam or dog carrying plate 50, which is loosely mounted on a shaft 51, which shaft is rotated by and with the rod 24, as by the worm 52 carried thereby (Figure 1) and which may engage a suitable gear 53 on the inner end of the shaft 51. The shaft 51 is thereby continuously rotated with the rod 24, the direction of its rotation being reversed with the reversals of the rod 24. The plate 50 is adapted for lost motion drive from the shaft 51 by the provision of an outwardly extending head 54, which is located between a pair of forwardly projecting adjustable lugs 55, the arrangement being such that, when the rod 24 is first rotated to move the head downward in rapid traverse, the shaft 51 and the head 54 will move in clockwise direction, the plate 50 standing still until the head 54 reaches the left hand lug 55, at which time the head will pick up the plate and move it, with the head, until such time as the direction of the rod 24 is reversed. The head 54 will then move in the opposite direction, the plate standing still until the head 54 reaches and engages the opposite lug 55.

The plate 50 is adapted to carry various controller cams and dogs, or the like, the inventive concept being adequately disclosed by indicating a cam 57 adapted to move the arm 44 upwardly and thus causing the clutch 25 to engage the gear 22 and a companion cam 58 adapted to retract the lever 44 thus to move the clutch from the gear 22 to the gear 33. The plate 50 may also carry a switch throwing dog 59 arranged to strike the switch arm of a switch 60 to control the driving motor 30. Obviously other cams and dogs may be arranged on the disk in accordance with the requirements of a mechanism to be controlled. The cams 57 and 58 are shown as adjustably mounted by means of a T-slot 61 in the plate 50. The dog 59 is shown as positioned on a flattened peripherial surface of the plate. Securement of the dogs and cams is a matter of mechanical expediency, and, if desired, they may be permanently secured on the plate; a feature of the invention being the fact that this adjustment of cycle may be made without the usual necessary adjustment of all the dogs and cams. Such adjustment is permitted by the mounting of the lugs 55 in an inner T-slot of the plate so that they may be adjusted to permit various differences in the amount of lost motion between the shaft 51 and plate 50.

In the operation of that form of the invention here shown, when the parts are in neutral position, the operator, first, moves the handle 46 upwardly, thus releasing the point of the arm 42 from the arrowhead 43 by the counter-clockwise movement of the lever. After the release of the point from the center notch of the arrowhead, the left face of the arrowhead will bear against the right face of the arm 42, thus assisting manual movement of the handle 46 to cause full engagement of the clutch 25 with the gear 33. At this time, the gear 33 is being rotated at high speed in a direction to cause downward movement of the tool head. Such rotation of the rod 24 will cause, with it, a clockwise movement of the shaft 51, the head 54 of which will leave the right hand lug 55 and will move toward the left hand lug 55. During such movement, the plate 50 is not moved. The length of such movement determines the traverse or non-cutting movement of the tool. At the end of such free movement, which is determined by the setting of the left hand lug 55, the head 54 will engage the lug and move the plate 50 in clockwise rotation; the cam 57 will engage the arm 44 and move the lever assembly in clockwise direction so that the arm 42 passes the point of the arrowhead, and its slanted right hand side will engage the slanted left hand side of the arm 42, ensuring the full engagement of the clutch 25 with the gear 22, which will rotate the rod 24 slowly to effect a slow downward feed of the tool.

During such feed, the head 54 is continuously in engagement with the left hand lug 55 and the disk is moved in synchronism with the feeding movement of the tool. Such movement will continue until the cam 58 engages the arm 44, moving it in counter-clockwise direction, again causing the clutch 25 to engage the gear 33. In the meantime, the dog 59 is operating the switch 60, which may be arranged to reverse the direction of the motor driving the gear 33, which is then rotated at a comparatively high speed, in a direction such as to cause the rod 24 to be reversely driven to raise the tool head when the clutch 25 is engaged with the gear 33. After such engagement, the shaft 51 is driven in reversed direction and the head 54 will thus leave the left hand lug 55 and there will be lost motion until the head 54 strikes the right hand lug 55 and moves the plate reversely until the parts are again in position.

From this consideration of the invention, it will be noted that without varying the feed cycle of a feed works, the traverse cycle may be readily altered by a mere adjustment of the lugs 55. The invention thus provides a simple and efficient control mechanism, avoiding the necessity of the manifold adjustment necessary in such devices now in use. Further, it will be obvious that size of the parts necessary in a continuously moving controlled device is not required in the present structure, since the amplitude of movement is confined only to the feeding cycle. It will be understood that the invention is not restricted to the structure arrangements here shown and that numerous changes and modifications, and the full use of the equivalent, may be resorted to in carrying out the invention without departing from the spirit and scope of the pending claims.

Having thus set forth the nature of my invention, what I claim is:

1. In a machine tool the combination with a plurality of independent means for driving a shaft, a selector for determining the drive of the shaft, a controller for operating said selector, means for establishing a driving connection between the controller and shaft during the movement of the shaft from one driving source and independent means for establishing a driving connection between said controller and shaft during the drive of the shaft from another source.

2. In a machine tool, a controller for a power assembly, cam means for operating the controller, a cam driving shaft constantly rotatable when drive is established between said shaft and cam and a lost motion connection between said shaft and cam for driving the latter intermittently.

3. In a machine tool, a controller for a power assembly, cam means for operating the controller, a cam driving shaft constantly rotatable when drive between said shaft and controller is established and an adjustable member forming a part of a lost motion connection between said shaft and cam for driving the latter intermittently.

4. In a machine tool the combination with a reversible shaft, a reversible cam carrying member operable thereby and lost motion connection therebetween to permit free movement of the shaft at the beginning of each reversal of direction thereof.

5. In a machine tool, a reversible shaft driving assembly, a drive controller, an operating means therefor, a cam carried by said operating means and a drive for said cam, including a lost motion connection therebetween for permitting said cam to remain stationary at the beginning of each reversal of said shaft.

6. In a machine tool, a reversible shaft driving assembly, a drive controller, an operating means therefor, a cam for said operating means, and a drive for said cam from said driving assembly, including a lost motion connection therebetween for permitting said cam to remain stationary at the beginning of each reversal of said shaft.

7. In a machine tool feed works, a shaft driving assembly, a clutch for controlling the drive of said shaft, a rotary cam for operating said clutch, means for rotating said cam from said shaft, said means including a cam driving shaft having a lost motion driving connection with said cam.

8. In a machine tool feed works, a shaft driving assembly, a clutch for controlling the drive of said shaft, a rotary cam for operating said clutch, means for rotating said cam from said shaft, said means including a cam driving shaft having a variable member forming a part of a lost motion driving connection with said cam.

9. In a machine tool feed works, a shaft driving assembly, a clutch for controlling the drive of said shaft, a rotary cam for operating said clutch, means for rotating said cam from said shaft, said means including a cam driving shaft having a head engageable between spaced lugs on said cam so as to permit lost motion between said cam and shaft.

10. In a machine tool feed works, a shaft driving assembly, a clutch for controlling the drive of said shaft, a rotary cam for operating said clutch, means for rotating said cam from said shaft, said means including a cam driving shaft having a head engageable between adjustable spaced lugs on said cam so as to permit variable lost motion between said cam and shaft and means for adjusting the position of, at least, one of said lugs.

11. In a machine tool feed works, a cam and drive assembly, including a cam carrying member, a drive shaft therefor, a head on said shaft and a pair of spaced head engaging lugs on said member, alternately engageable with said head upon reversal of direction of rotation of said shaft.

12. In a machine tool feed works, a cam and drive assembly, including a cam carrying member, a concentric drive shaft therefor, upon which it is mounted, means on said shaft for driving said member therefrom and a pair of spaced adjustable lugs on said cam, alternately engageable by said means to alternately drive said member in opposite directions by said shaft.

13. In a machine tool feed works, the combination with a feed shaft of a clutch for controlling it, a cam carrying member for operating said clutch, a cam driving shaft rotatable by and with said feed shaft, and a lost motion connection between said cam driving shaft and cam, operable to permit said cam to remain stationary during portions of the movement of said feed shaft.

14. In a machine tool feed works, the combination with a feed shaft of a clutch for controlling it, a cam carrying member for operating said clutch, a cam driving shaft rotatable by and with said feed shaft, and a lost motion connection between said cam driving shaft and cam, operable to permit said cam to remain stationary during portions of the movement of said feed shaft, said connection being variable to adjust the amount of lost motion between said cam driving shaft and said member.

15. In a machine tool feed works, a feed shaft, a reversible gear for driving said shaft, a clutch for actuating said shaft from said gear, a controller for moving said clutch, a cam carrying member for operating said controller, a drive shaft for said cam carrying member geared to said feed shaft to be continuously and reversibly driven with said feed shaft during the operation thereof by said gear and a lost motion connection with said drive shaft and said cam whereby said cam will be stationary during the initial portion of the reversed operations of said cam driving shaft.

16. In a machine tool feed works, a feed shaft, a reversible gear for driving said shaft, a clutch for actuating said shaft from said gear, a controller for moving said clutch, a cam carrying member for operating said controller, a drive shaft for said cam carrying member geared to said feed shaft to be continuously and reversibly driven with said feed shaft during the operation thereof by said gear and a lost motion connection with said drive shaft and said cam whereby said cam will be stationary during the initial portion of the reversed operations of said cam driving shaft, said connection including a head on the cam driving shaft and a pair of adjustable lugs on the cam carrying member alternately engageable with said head during the reversed operations of said cam driving shaft.

EDWARD P. BULLARD, III.